United States Patent
Yamaguchi et al.

(10) Patent No.: US 6,446,146 B1
(45) Date of Patent: Sep. 3, 2002

(54) LINE TERMINATING DEVICE

(75) Inventors: Tomoyuki Yamaguchi; Jyoei Kamoi; Iwao Tada, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/296,841

(22) Filed: Apr. 22, 1999

(30) Foreign Application Priority Data

Aug. 20, 1998  (JP) ............................................. 10-234029

(51) Int. Cl.[7] ............................................. G06F 13/00
(52) U.S. Cl. ........................................................ 710/100
(58) Field of Search ................................. 710/100, 101, 710/105, 106, 129, 131, 305, 316; 375/257, 377; 370/235, 278, 282, 298, 299, 464, 420; 326/30

(56) References Cited

U.S. PATENT DOCUMENTS

| | | | | |
|---|---|---|---|---|
| 5,677,931 A | * | 10/1997 | Okuyama et al. | ............ 375/260 |
| 5,784,377 A | * | 7/1998 | Baydar et al. | ............ 370/357 |
| 5,920,563 A | * | 7/1999 | Fukui et al. | ............. 370/395.5 |

FOREIGN PATENT DOCUMENTS

| | | | |
|---|---|---|---|
| JP | 57132456 A | * | 8/1982 |
| JP | 5-7219 | | 1/1993 |
| JP | 11313127 A | * | 11/1999 |

\* cited by examiner

*Primary Examiner*—Xuan M. Thai
(74) *Attorney, Agent, or Firm*—Katten Muchin Zavis Rosenman

(57) ABSTRACT

To reduce a scale of the circuit, a number of the external terminals, processing steps in developing a firmware, and a scale of the firmware, a line terminator provided in a device for terminating SONET/SDH lines, each having a different line speed, terminates plural lines, each having a different line speed, and includes a clock generator generating a clock corresponding to each line speed, a line switching circuit for specifying one of the plural lines, a selector for outputting data of one of the plural lines, which is specified by the line switching circuit, and a common processing circuit for processing data of the one line output from the selector, according to a clock corresponding to the line speed generated in the clock generator.

2 Claims, 10 Drawing Sheets

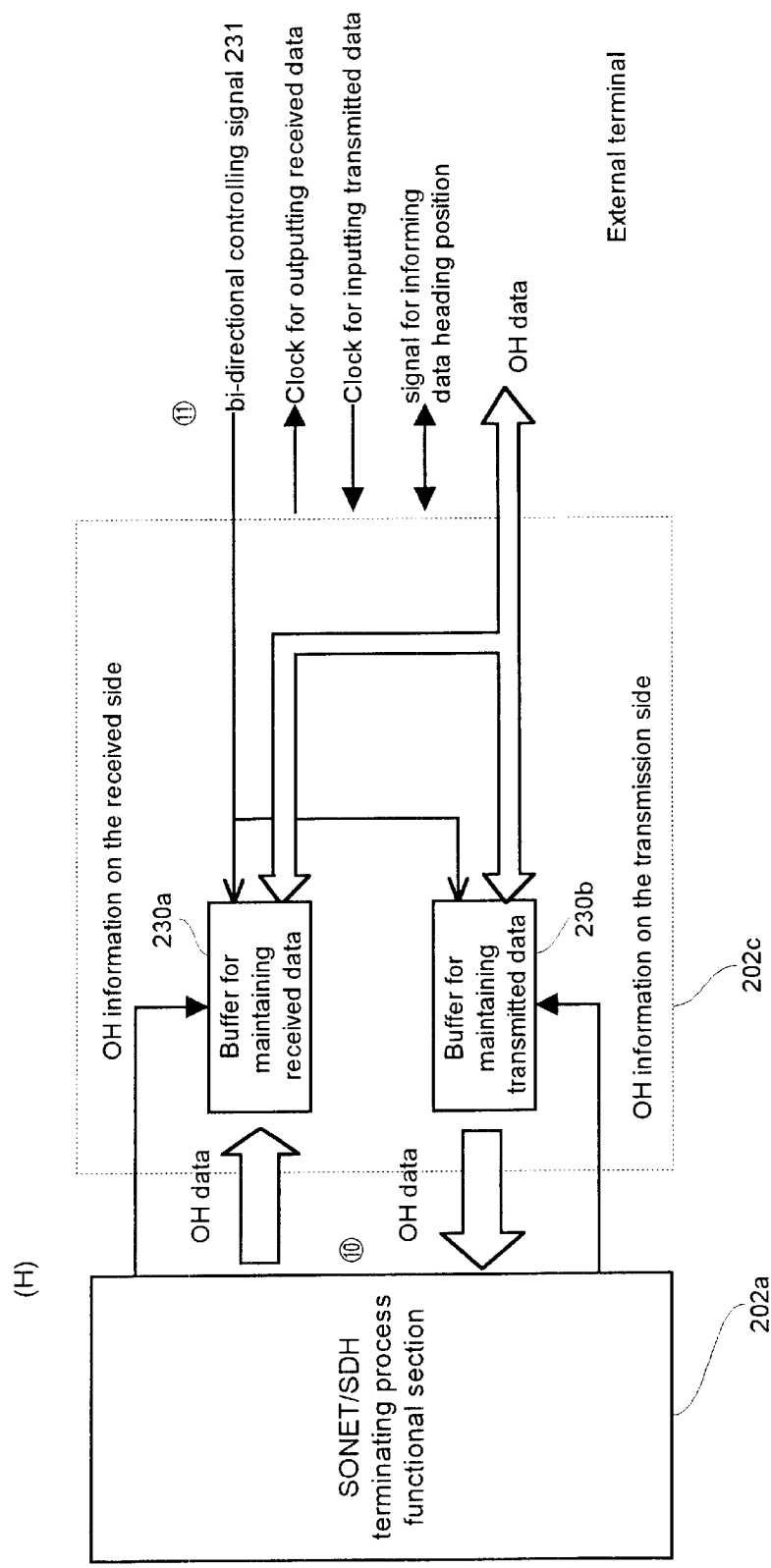

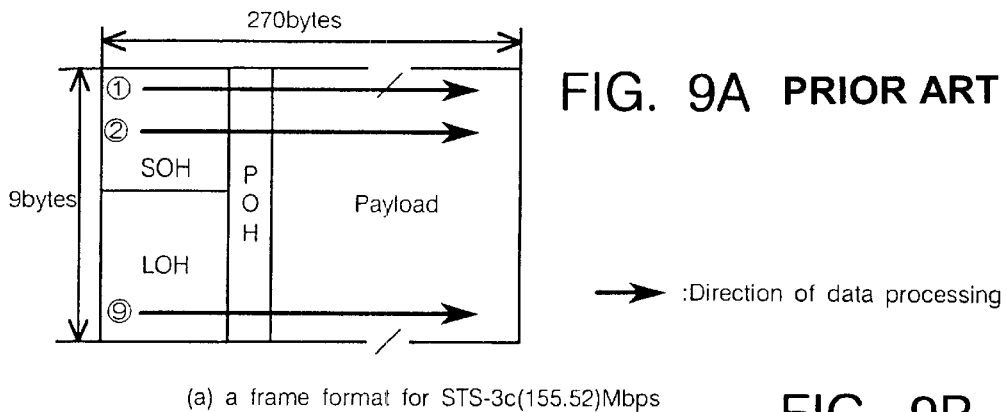
(a) a frame format for STS-3c(155.52)Mbps
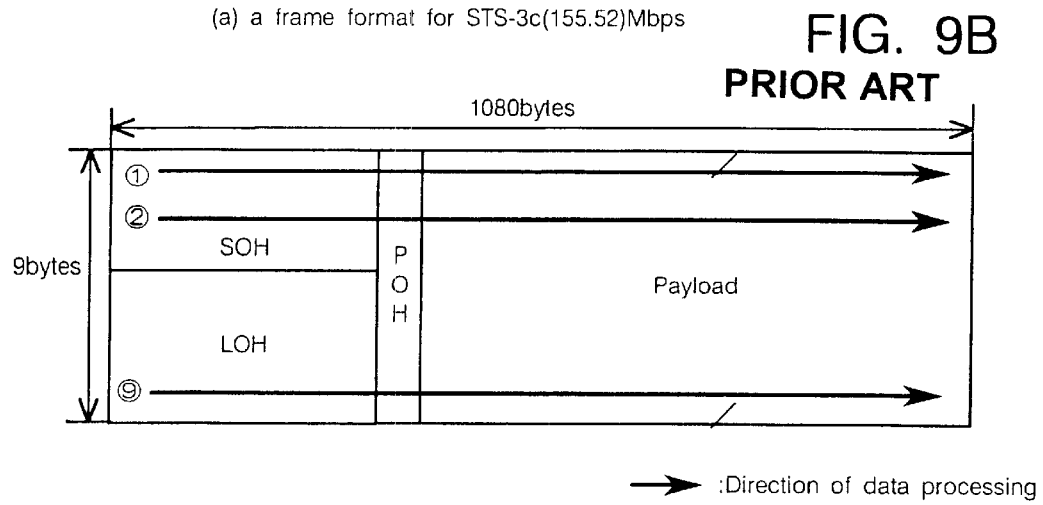
(b) a frame format for STS-12c(622.08)Mbps
SOH : Section Over Head
LOH : Line Over Head
POH : Path Over Head

LINE TERMINATING DEVICE

BACKGROUND OF THE INVENTION

1. Field of the Invention

The present invention relates to a line terminating device for terminating subscriber lines accommodated in an ATM exchange. More particularly, it relates to a line terminating device, which terminates different lines in a synchronous optical network (hereinafter, it called as SONET) and a synchronous digital hierarchy (hereinafter, it called as SDH) network.

FIG. 8 shows a general system structure of an ATM exchange, in which SONET/SDH lines are accommodated. In FIG. 8, the ATM exchange contains line terminating devices 10, each of which has function of interfacing lines, and an ATM self-routing switch 20.

The line terminating device 10 interfaces the ATM switch 20 with either an OC3C/STM-1 optical transmission path having a speed of 155.52 Mbps or an OC12C/STM-4 optical transmission path having a speed of 622.08 Mbps.

In here, a frame format of a signal flowing to the OC3C/STM-1optical transmission path having the speed of 155.52 Mbps is shown in FIG. 9A. The frame format has a frame size of 9 bytes ×270 bytes, and therefore, data of total 2,430 bytes is transmitted with 125 μs.

On the other hand, a frame format of a signal flowing to the OC12C/STM-4 optical transmission path having the speed of 622.08 Mbps is shown in FIG. 9B. The frame format has the same frame size as the fourth times of that of the signal shown in FIG. 9A. In other words, the frame format shown in FIG. 9B has the frame size of 9 bytes×1,080 bytes, and therefore, data of the total 9,720 bytes is transmitted with 125 μs.

Additionally, both of the above-described frame formats have areas for alarming or quality management, which are so called section over head (SOH), line over head (LOH) and path over head (POH). On the other hand, a payload section is actually used as a data area to map an ATM cell and the like.

The line terminating device 10 is required to process signals of the above-described frame formats having different line speeds. Accordingly, the conventional line terminating device 10 of the ATM exchange is constituted so as that a peculiar physical layer terminating section is provided corresponding to each transmission speed, as shown in FIGS. 10A and 10B.

FIG. 10A illustrates an example of the conventional hardware structure, in which a hardware 200a for processing a signal of 155.52 Mbps and the corresponding physical layer terminating section 100a connected to the line of the speed of 155.52 Mbps are provided. On the other hand, FIG. 10B illustrates an example of the conventional hardware structure, in which a hardware 200b for processing a signal of 622.08 Mbps and the corresponding physical layer terminating section 100b connected to the line of the speed of 622.08 Mbps are provided.

Therefore, it has been considered that independent hardware devices 200a and 200b should be prepared respectively for different line speeds in the conventional ATM exchange system. A line speed of the transmission path accommodated in an ATM exchange depends on how to construct a transmission system.

In the conventional ATM exchange system, assuming a general combination of the line speeds, correspondingly hardware devices 200a and 200b for signal processing are provided to constitute a line terminating device.

That brings a problem such that a circuit scale becomes large because one circuit is required for one line speed, and therefore, plural circuits are required for different line speeds. Additionally,different firmware for controlling each circuit structure should be prepared independently. That brings another problem such that the cost and the manufacturing steps are increased when developing an ATM exchange system.

SUMMARY OF THE INVENTION

Accordingly, it is an object of the present invention to provide a line terminating device to solve the above-described conventional problems.

It is another object of the present invention to provide a line terminating device, which terminates lines, each having a different line speed, in SONET/SDH networks, to reduce a scale of the circuit, the number of external terminals, the number of steps of developing a firmware, and a scale of the firmware.

The above-described objects of the present invention can be achieved by a line terminating device, which terminates plural SONET/SDH lines, including a main signal processor where clock and data lines are commonly used, and a selector for selecting one of the plural SONET/SDH lines.

The main signal processor processes the data of the selected one of the plural SONET/SDH lines, which is switched and output by the selector, according to a clock signal corresponding to the selected line speed.

In one preferred mode of the present invention, the clock signal corresponding to the line speed switched and output by the selector is switched and output from the plural clock signals corresponding to each of the plural SONET/SDH lines, which is generated from one oscillating source.

Alternatively, in other preferred mode of the present invention, the main signal processor extracts an over head of the data of the line output from the selector according to a clock signal corresponding to the line speed of the line switched and output from the selector, and further includes an interface section having an area for storing monitored information in the extracted overhead in each address corresponding to the status of the monitored information, and a firmware for collecting the monitored information stored in the interface section.

Further, other objects of the present invention will become clear by the description for explaining embodiments according to the attached drawings.

BRIEF DESCRIPTION OF THE DRAWINGS

FIG. 4 is an explanatory diagram of a structure of a SONET/SDH terminating process functional section 202a.

FIG. 6 shows a structural example of an overhead (OH) input/output section 202c.

FIG. 9A shows a signal frame format of a transmission line of 155.52 Mbps and

FIG. 9B shows a signal frame format of a transmission line of 622.08 Mbps.

DESCRIPTION OF THE PREFERRED EMBODIMENTS

Figure 1:
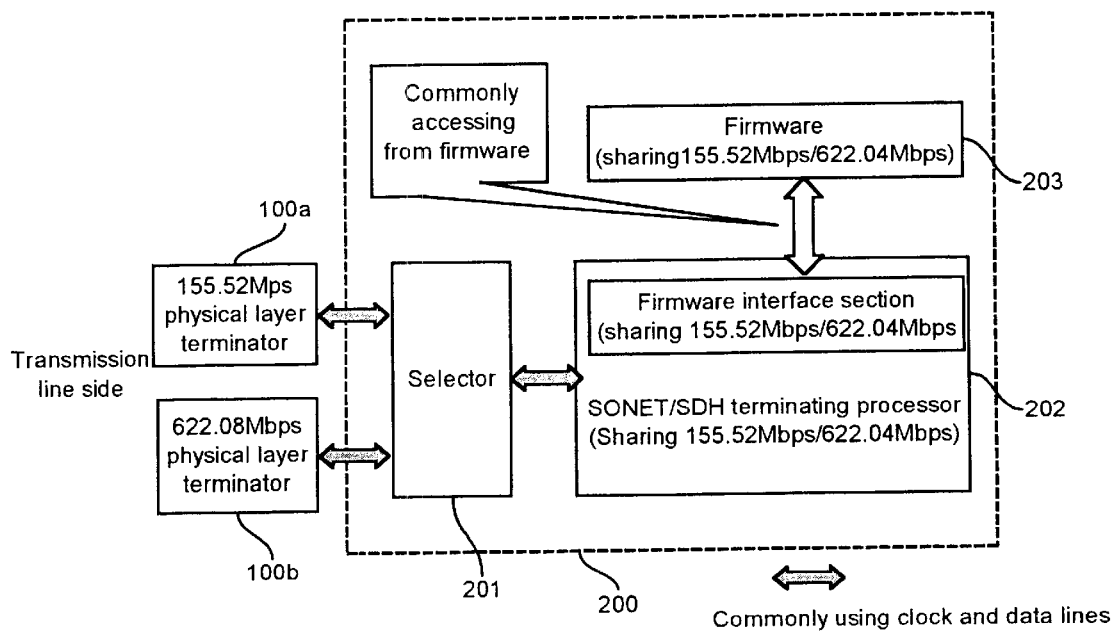
FIG. 1 is an explanatory diagram of an outline of a structure of a line terminator according to the present invention.

Hereinafter, embodiments of the present invention will be explained in accompanying with the attached drawings. Throughout the following descriptions, the same reference numerals are used to denote and identify corresponding or identical components.

FIG. 1 is an explanatory diagram showing an outline of a structure of a line terminating device according to the present invention. In this embodiment, the line terminating device has a physical layer terminator 100a, which terminates lines of 155.52 Mbps, and a physical layer terminator 10b, which terminates lines of 622.08 Mbps. The line terminating device further includes a common section 200, which accommodates the physical layer terminators 10a and 10b.

The common section 200 has a selector 201, which switches and selects outputs from the physical layer terminators 100a and 100b, basically, according to the system settings. A SONET/SDH termination processor 202 processes the data output from the selector 201 according to a program stored in a firmware 203.

In this way, the common section 200 can compose the SONET/SDH termination processor 202 and the firmware 203 with the same structure according to the present invention.

Figure 2:
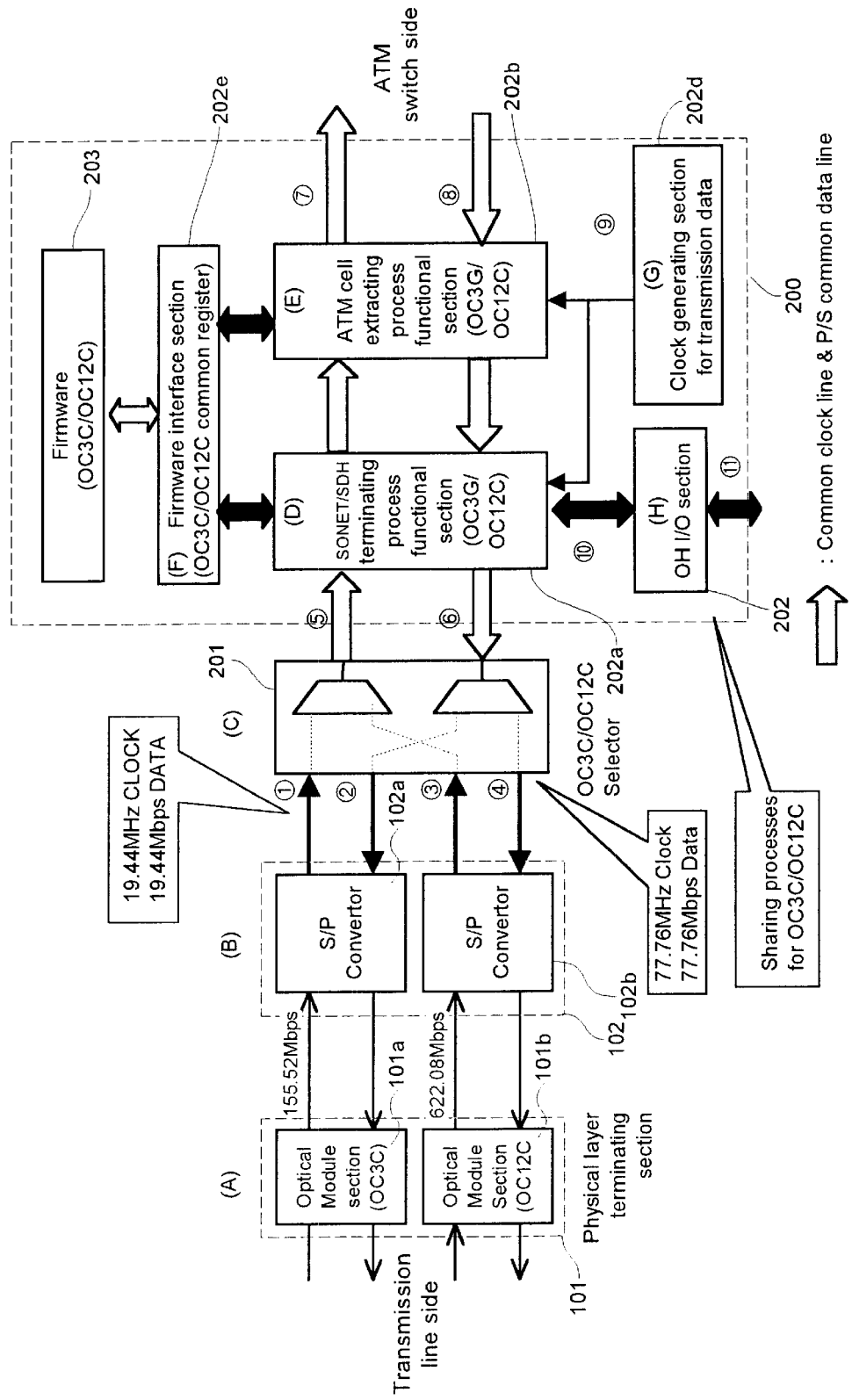
FIG. 2 is a block diagram of a detailed structural example corresponding to the structure of FIG. 1.

FIG. 2 is a detailed structural block diagram of the line terminating device shown in FIG. 1. Throughout the descriptions, the same numerals enclosed by circles are used in the diagrams.

The physical layer terminating section is unitedly constructed in FIG. 2. Further, the unitedly structured physical layer terminating section has optical module section 101, which converts an optical signal of the transmission path into an electrical signal, and a serial/parallel converting section 102, which converts a serial signal into a parallel signal of 8 bits and vice versa.

Each of the optical module section 101 and the serial/parallel converting section 102 has optical modules 101a and 101b and serial/parallel converters 102a and 102b for lines having the speed of 155.52 Mbps (OC3C) and lines having the speed 622.08 Mbps (OC12C).

In this example, when the optical modules 101a and 101b convert optical signals transmitted from the transmission lines into electrical signals, the modules demultiplex the signals into data signals and clock signals and output the demultiplexed signals. Therefore, the outputs from the serial/parallel converters 102a and 102b become a parallel signal of 8 bits having the speed of 19.44 Mbps, a clock signal of 19.44 MHz, a parallel signal of 8 bits having the speed of 77.76 Mbps and a clock signal having the speed of 77.76 MHz.

The SONET/SDH termination processor 202 shown in FIG. 1 has a SONET/SDH terminating process functional section 202a, an ATM cell extracting process functional section 202b, an over head (OH) input/output section 202c, a clock generating section 202d for transmission data process and a firmware interface section 202e.

The selector 201 unitedly selects and connects either of the serial/parallel converters 102a and 102b connected to the SONET/SDH terminating process functional section 202a according to the system structure.

The SONET/SDH terminating process functional section 202a performs an overhead (OH) process, an alarm detection process and the like. The ATM cell extracting process functional section 202b extracts ATM cells. The firmware interface section 202e interfaces with the firmware 203.

The over head (OH) input/output section 202c interfaces with the external devices through over heads. The clock generating section 202d for transmission data process generates a clock, which is used to perform data processing on the transmission line side.

The serial data of the OC3C line having the speed of 155.52 Mbps and the serial data of the OC12C line having the speed of 622.08 Mbps, which are input from the transmission line side, are converted into parallel data of 8 bits at serial/parallel converters 102a and 102b, respectively. Then, the converted parallel data are input to the selector 201 with the corresponding clock signals of 19.44 MHz and 77.76 MHz.

The selector 201 selects the data signal and the clock signal of either of the OC3C line or OC12C line. Then, the selector 201 transmits the output to the ATM switch side through the SONET/SDH terminating process functional section 202a and the ATM cell extracting process functional section 202b.

On the other hand, the data and the clock signal input from the ATM switch are passed through the ATM cell extracting process functional section 202b and the SONET/SDH terminating process functional section 202a. After that, the selector 201 selects the data and clock signals of either of the OC3C line or the OC12C line, and the serial/parallel converter 102a or 102b corresponding to the selected line of OC3C or OC12C converts the data and clock signals into serial data.

After that, the corresponding optical module 101a or 101b in the physical layer terminating section converts the serial data into an optical signal and outputs the data to the transmission line side.

The clock and data lines are commonly used for the OC3C and OC12C lines in the common section 200 of FIG. 2. Concurrently, the firmware interface section 202e and the OH input/output section 202c are also commonly used for the OC3C and OC12C lines. Thereby, it becomes possible to reduce a scale of the circuit.

Figure 3:
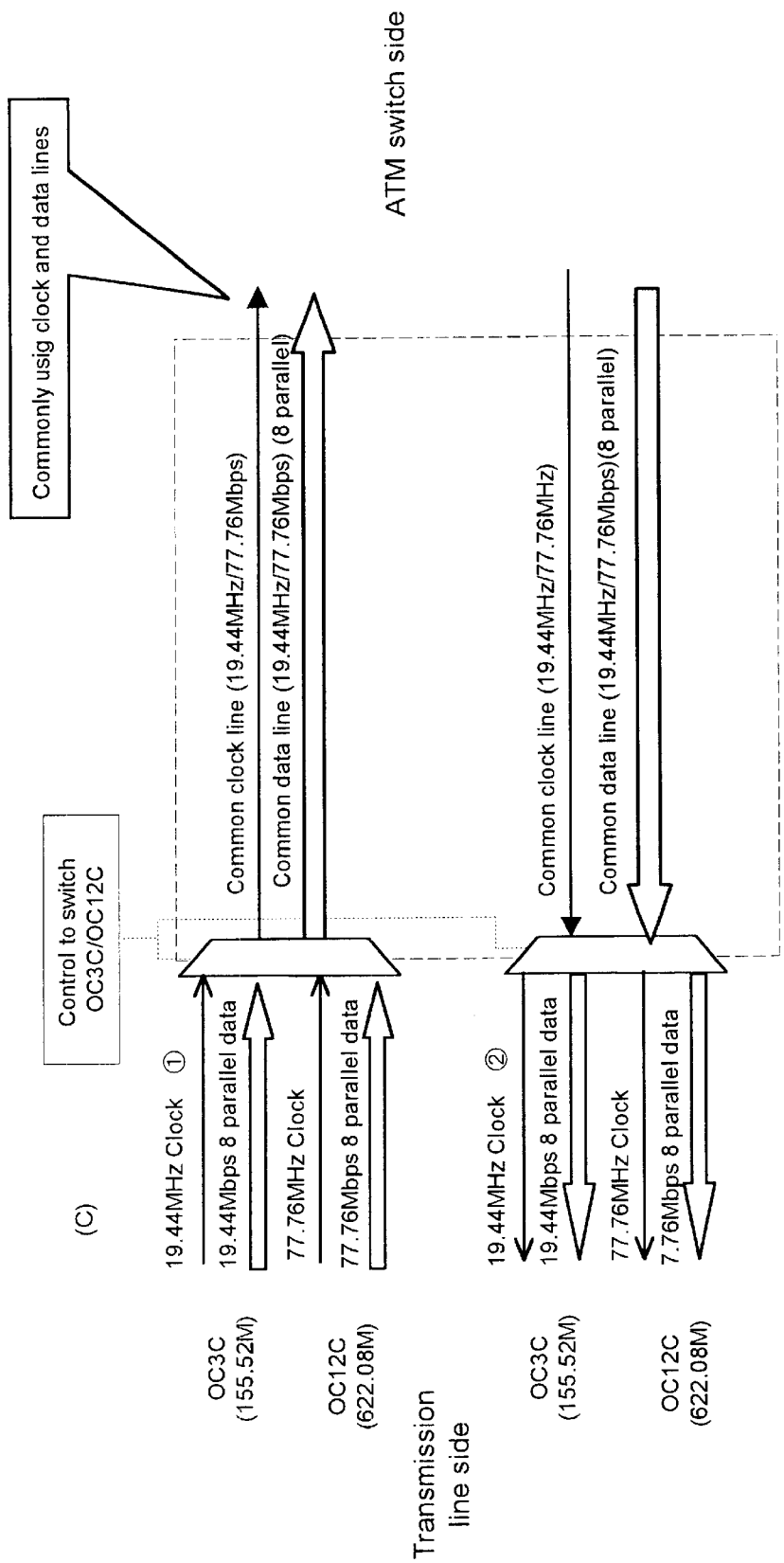
FIG. 3 is an explanatory diagram of a flow of the data and clock signals in a selector 201, which selects line of OC3C or OC12C.

FIG. 3 is an explanatory diagram for explaining a flow of the data and clock signals at the selector 201, which selects the line of OC3C or OC12C. In FIG. 3, the selector 201 selects either the clock signal of 19.44 MHz and the parallel data signal of 8 bits having the speed of 19.44 Mbps for the OC3C line (refer to ① of FIG. 3) or the clock signal of 77.76 MHz and the parallel data signal of 8 bits having the speed of 77.76 Mbps for the OC12C line (refer to ③ of FIG. 3), each of which is input from the transmission line side, and outputs them to the ATM switch (refer to (⑤ of FIG. 3).

On the other hand, the selector 201 selects either of the clock signal of 19.44 MHz and the parallel data signal of 8 bits having the speed of 19.44 Mbps for the OC3C line or the clock signal of 77.76 MHZ and the parallel data signal of 8 bits having the speed of 77.76 Mbps for the OC12C line (refer to ⑥ of FIG. 3), each of which is input from the ATM switch, and outputs them to the transmission line side (refer to ② or ④).

Figure 4:
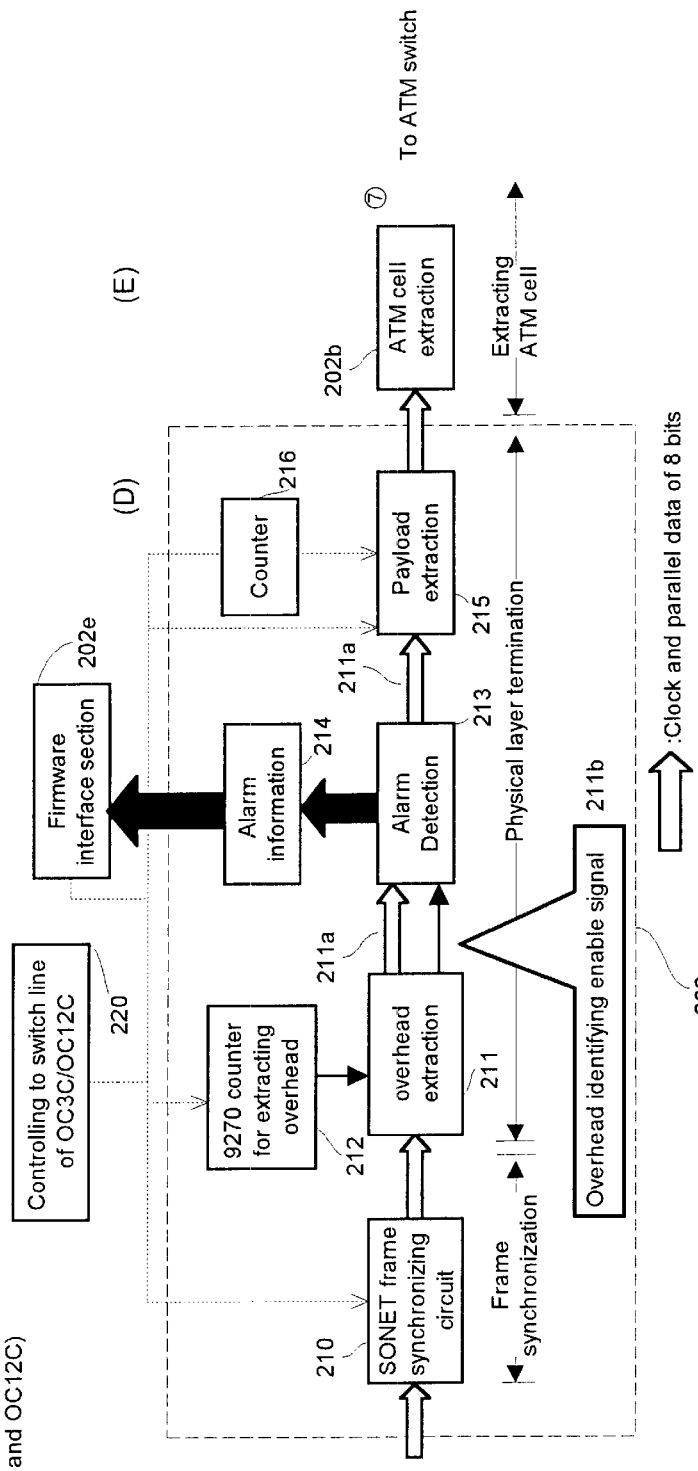

FIG. 4 is an explanatory diagram of a structure of the SONET/SDH terminating process functional section 202a.

The clock and data signals selected in the OC3C/OC12C line selector 201 are input to a SONET frame synchronizing section 210, at first. The SONET frame synchronizing section 210 detects each synchronizing pattern of the OC3C and OC12C lines, and performs synchronization. It is determined at which OC3C or OC12C line the synchronization is performed according to a switching signal transmitted from an OC3C/OC12C line switching controller 220.

When executing the system settings, an operator inputs information which line of OC3C or OC2C is selected to the OC3C/OC12C line-switching controller 220.

The data obtained by performing the synchronization in the SONET frame synchronizing section 210 is input to an overhead (OH) extracting section 211. An counter 212 for extracting an over head counts to 2430 (9×270) for the OC3C line and counts to 9720 (9×270×4) for the OC12C line.

Therefore, the OH extracting section 211 extracts an over head (OH) section, and generates an over head (OH) identifying enable signal 211b, according to the counted value at the OH extracting counter 212.

The OH identifying enable signal 211b is transmitted to an alarm detection section 213 for physical layer with the data signal 211a, which is passed through the OH extracting section 211. The alarm detection section 213 for physical layer detects an alarm flag on a predetermined position of the OH section of the data signal 211a according to the OH identifying enable signal 211b.

An alarm informing section 214 analyzes each alarm of the physical layer according to the detected alarm flag, transmits the each alarm to the firmware 203, not shown in FIG. 4, through the firmware interface section 202e. Therefore, the firmware 203 collects each alarm of the physical layer, and the collected information is used to maintain the whole system.

On the other hand, the data signal 211a is transmitted to a payload extracting section 215. In this example, the SONET/SDH terminating process functional section 202a further includes a counter 216 for extracting a payload. The counted value in the counter 216 for extracting a payload is input to the payload extracting section 215.

In this example, the counter 216 for extracting a payload has the same structure and function of the above-mentioned counter 212 for extracting an overhead. Therefore, it is also possible to construct as to input the counted value from the counter 212 for extracting an overhead to the payload extracting section 215.

A payload is extracted for frame formats of FIGS. 9A and 9B according to the counted value of the counter 216 for extracting a payload to transmit to the ATM cell extracting section 202b. The ATM cell extracting section 202b extracts an ATM cell, and outputs it to the ATM switch.

Figure 5:
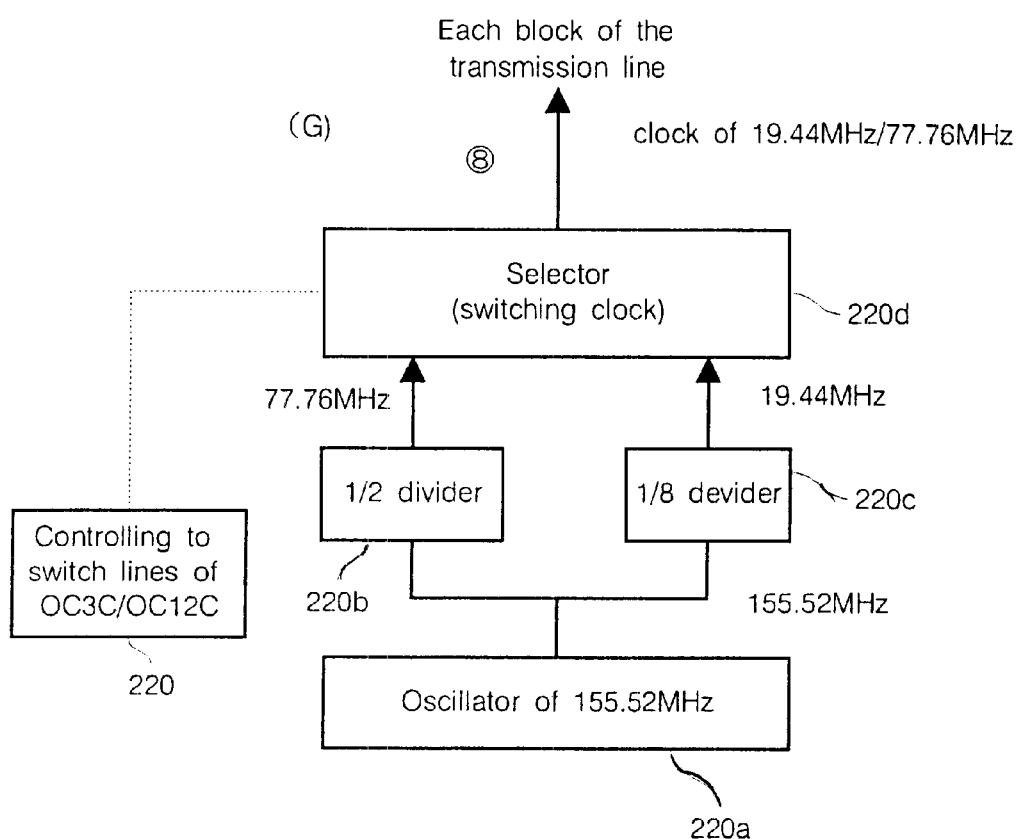
FIG. 5 is a block diagram of a structural example of a clock generator included in an OC3C/OC12C line-switching controller 220.

FIG. 5 is a block diagram of a structural example of a clock generating section 202d, which is provided in the common section 200. The clock generating section 202d includes an oscillator 220a of 155.52 MHz, which is divided into half by a ½ divider 220b to obtain a clock signal of 77.76 MHz, or is divided into eight by a ⅛ divider 220c to obtain a clock signal of 19.44MHz.

Two clock signals of 77.76 MHz and 19.44 MHz are respectively input to the selector 220d. When the system is set for the OC3C line according to the switching control signal transmitted from the OC3C/OC12C line switching controller 220, the clock signal of 19.44 MHz is selected and output. On the other hand, when the system is set for the OC12C line, the clock signal of 77.76 MHz is selected and output.

FIG. 6 is a structural example of the OH input/output section 202c. The OH input/output section 202c includes a buffer 230a for maintaining the received data and a buffer 230b for maintaining transmission data, each of which has a memory capacity for one frame. After the SONET/SDH terminating process functional section 202a extracts OH data of the SONET frame, the data is output through the buffer 230a for maintaining the received data to the external terminal.

On the other hand, the OH data transmitted to the transmission line is input from the external terminal, and is transmitted to the SONET/SDH terminating process functional section 202a through the buffer 230b for maintaining transmission data.

In this example, the frame pulse and data are shared for input and output sides. Therefore, timings of the input and output sides are controlled by a bi-directional controlling signal 231 transmitted from a bi-directional controlling section, not shown in FIG. 6.

In other words, the received data is stored in the buffer 230a for maintaining the received data with the received OH information. Then, the data signal of the buffer 230a for maintaining the received data is output to the external device, together with a frame pulse for showing headers of the clock and data signals, in the timing of the bi-directional controlling signal 231, i.e., an enable status for outputting the data to the external device.

The transmission data is input from the external device together with a frame pulse showing headers of the clock and data signals in the timing of the bi-directional controlling signal 231 input from the bi-directional controlling section, i.e. an enable status for outputting the data to the external device, and is maintained in the buffer 230b for transmission and maintenance once. After that, the transmission data is output in the timing of each over head of the transmission frame, and is transmitted to the transmission line side.

Figure 7A:
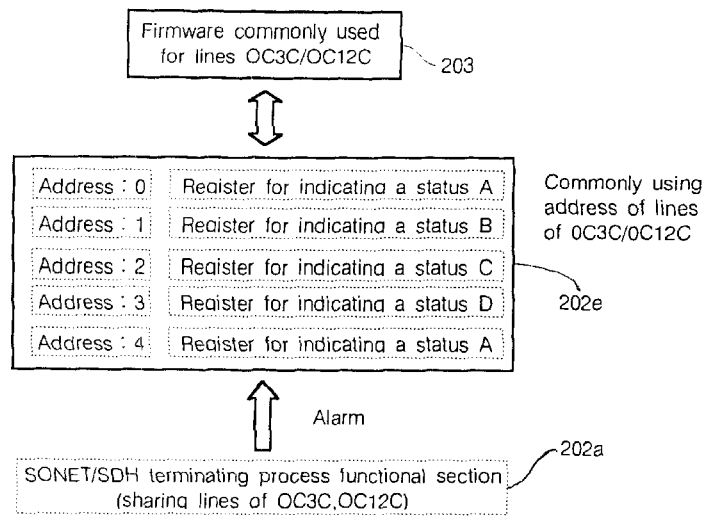
FIGS. 7A, 7B and 7C are explanatory diagrams of a firmware interface section 2023.
Figure 7B:
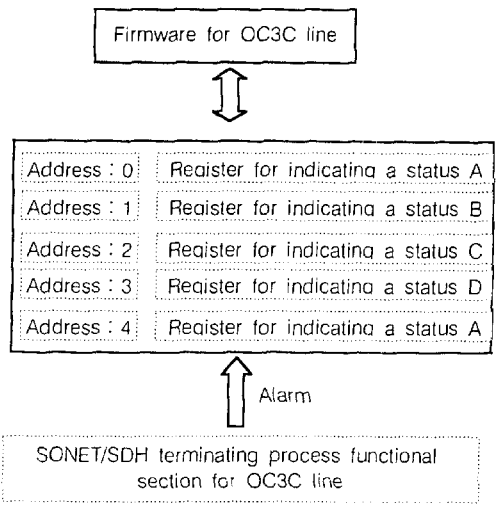
Figure 7C:
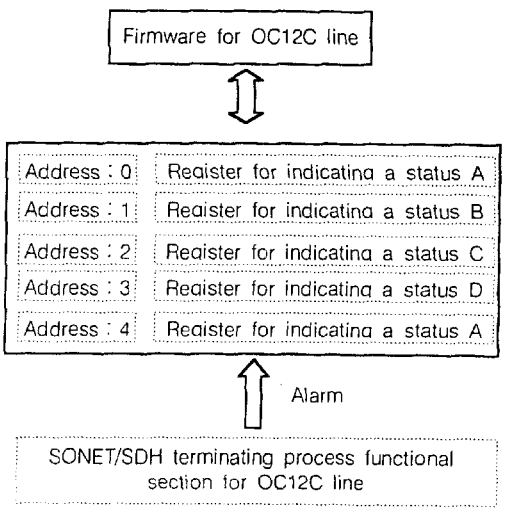
Figure 8:
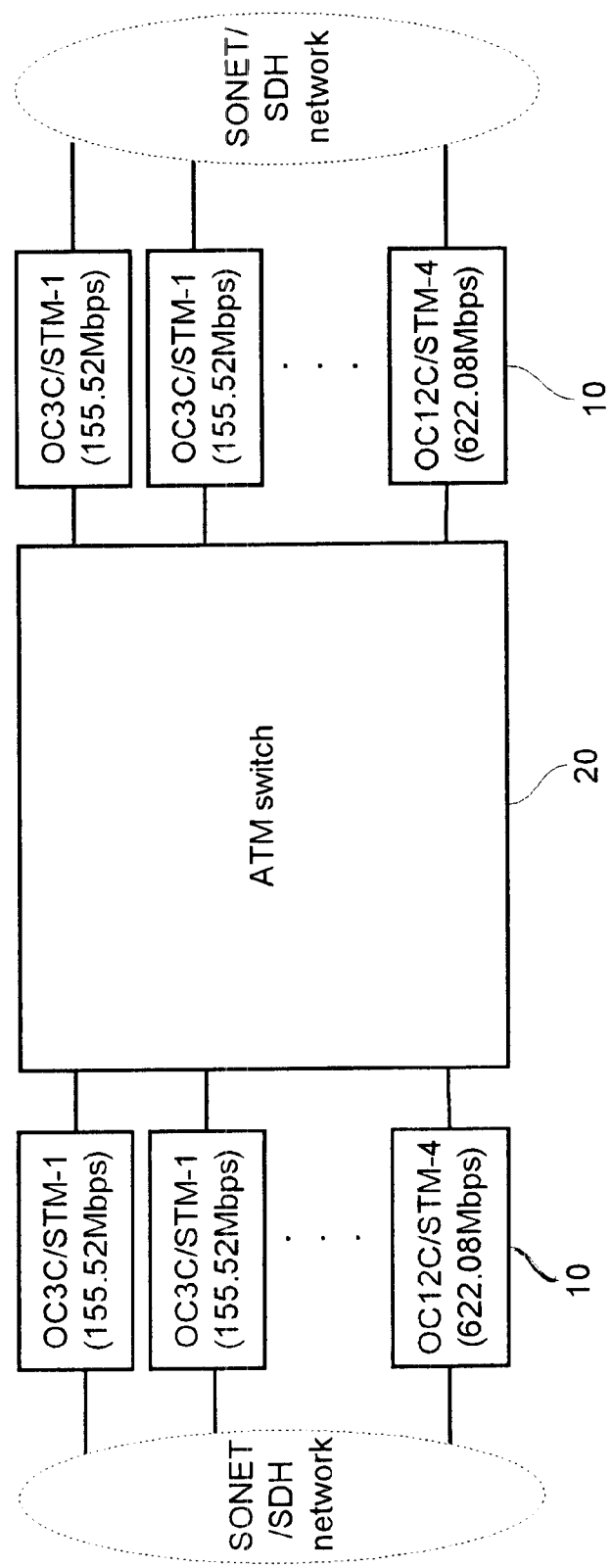
FIG. 8 shows a general system structure of an ATM exchange, which accommodates a SONET/SDH line.
Figure 10A:
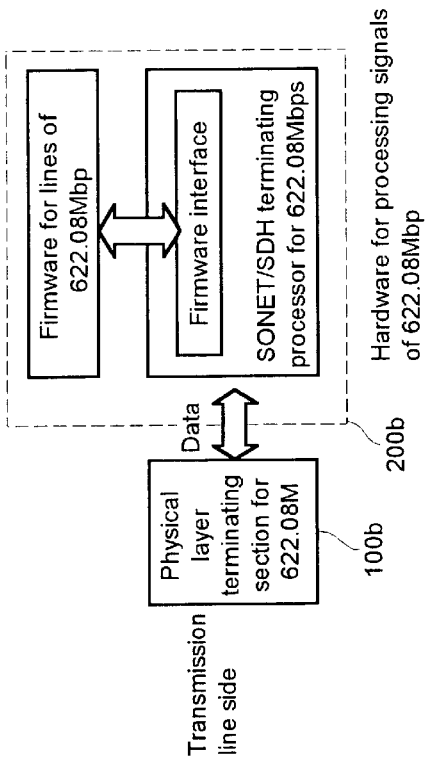
FIGS. 10A and 10B show structural examples of line terminators corresponding to each line speed.
Figure 10B:
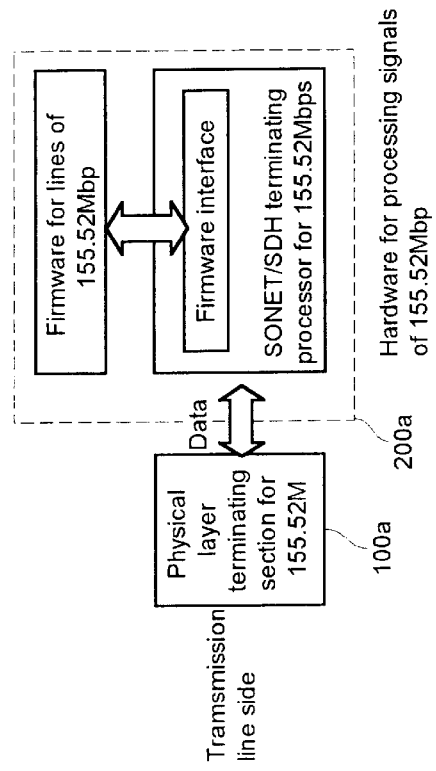

FIGS. 7A, 7B and 7C are explanatory diagrams of the firmware interface section 202e. FIG. 7B and FIG. 7C respectively show firmware interface sections for the OC3C and OC12C lines. Each of the firmware interface sections has a firmware and a SONET/SDH terminating process functional section.

In opposite to that, the firmware interface section is connected to the SONET/SDH terminating process functional section 202a and the firmware 203, each of which is commonly used for the lines of OC3C and OC12C in a structure of FIG. 7A according to the present invention.

The firmware interface section 202e includes status indication registers for displaying the statuses A to E corresponding to addresses 0 to 4. An alarm transmitted from the SONET/SDH terminating process functional section 202a is set to each register for displaying the corresponding status.

The firmware 203 can refer the display for indicating the corresponding status by accessing the address of the firmware interface section 202e.

The address of the firmware interface section 202e is commonly used for the lines of OC3C and OC12C, and it is possible to access each address.

As is explained in the embodiments according to the attached drawings, it becomes possible to reduce a scale of the circuit, a number of the external terminals, steps for developing a firmware and a scale of the firmware in the device for terminating lines each having a different speed, i.e., SONET/SDH line or the like, according to the present invention.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A line terminator, which terminates plural lines, each having a different line speed, comprising:

a clock generator for the plural lines for generating clock signals, each corresponding to each line speed;

a line switching circuit for specifying one of the plural lines;

a selector for outputting data of one of the plural lines, which is specified by the line switching circuit; and a common processing circuit commonly provided for the plural lines respectively having different line speeds for processing data of the one line output from the selector, according to a clock corresponding to the line speed generated in the clock generator, wherein the common processing circuit extracts an over head of the data of the one line output from the selector according to the clock corresponding to the speed of the one line, and further includes:

an interface section having an area for storing monitored information in the extracted overhead in the corresponding address corresponding to the status of the monitored information, and a firmware for collecting the monitored information stored in the interface section.

2. A line terminator, which terminates plural SONET/SDH lines, comprising:

a main signal processor where clock and data lines are commonly used for the plural lines respectively having different line speeds; and a selector for selecting one of the plural SONET/SDH lines, wherein the main signal processor processes the data of the selected one of the plural SONET/SDH lines, which is switched and output by the selector, according to a clock signal corresponding to the selected line speed, wherein the clock signal corresponding to the line speed switched and output by the selector is switched and output from the plural clock signals corresponding to each of the plural SONET/SDH lines, which are generated from one oscillating source, and wherein the main signal processor extracts an over head of the data of the line output from the selector according to a clock signal corresponding to the line speed of the line switched and output from the selector, and further includes, an interface section having an area for storing monitored information in the extracted overhead in each address corresponding to the status of the monitored information; and a firmware for collecting the monitored information stored in the interface section.

* * * * *